(12) United States Patent
Kramar

(10) Patent No.: US 12,071,981 B2
(45) Date of Patent: Aug. 27, 2024

(54) PIVOT CRADLE BEARING AND METHOD FOR PRODUCING A SYNCHRONIZATION DEVICE OF A PIVOT CRADLE BEARING

(71) Applicant: Schaeffler Technologies AG & Co. KG, Herzogenaurach (DE)

(72) Inventor: Vasyl Kramar, Grettstadt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 193 days.

(21) Appl. No.: 17/636,393

(22) PCT Filed: Jul. 27, 2020

(86) PCT No.: PCT/DE2020/100668
§ 371 (c)(1),
(2) Date: Feb. 18, 2022

(87) PCT Pub. No.: WO2021/032243
PCT Pub. Date: Feb. 25, 2021

(65) Prior Publication Data
US 2022/0282756 A1 Sep. 8, 2022

(30) Foreign Application Priority Data
Aug. 21, 2019 (DE) .......................... 102019122435.7

(51) Int. Cl.
*F16C 33/30* (2006.01)
*F16C 19/50* (2006.01)
*F16C 33/46* (2006.01)

(52) U.S. Cl.
CPC .......... *F16C 33/306* (2013.01); *F16C 19/502* (2013.01); *F16C 33/4605* (2013.01); *F16C 33/4635* (2013.01); *F16C 2360/42* (2013.01)

(58) Field of Classification Search
CPC .... F16C 11/0614; F16C 19/502; F16C 21/00; F16C 33/306; F16C 33/4605;
(Continued)

(56) References Cited

U.S. PATENT DOCUMENTS

2011/0192276 A1* 8/2011 Spielvogel .............. F04B 1/126
92/71

FOREIGN PATENT DOCUMENTS

CN 1294036 A 5/2001
CN 102146903 A 8/2011
(Continued)

OTHER PUBLICATIONS

Machine Translation of JP-2001304098-A (Year: 2001).*
Machine Translation of DE-102007062008-A1 (Year: 2009).*
Machine Translation of CN-107435618-A (Year: 2017).*

*Primary Examiner* — Alan B Waits
(74) *Attorney, Agent, or Firm* — Volpe Koenig

(57) ABSTRACT

A pivot cradle bearing (1) for an axial piston machine, including a bent cage segment (2), in which rolling bodies are guided, which are arranged between two bearing parts which can be pivoted with respect to one another, wherein a synchronization device (4), which is designed for synchronizing the relative movement of the bearing parts with the displacement of the cage segment (2), includes a pivoting lever (5) which is mounted in the cage segment (2). An articulated bearing (6) is provided for mounting the pivoting lever (5) in the cage segment (2), the articulated bearing having an asymmetrical design with respect to a tangential plane (TE) lying centrally between an inner circumferential surface and an outer circumferential surface of the cage segment (2).

13 Claims, 3 Drawing Sheets

(58) Field of Classification Search
CPC .............. F16C 33/4635; F16C 2220/40; F16C 2226/52; F16C 2360/42; F03C 1/0634; F03C 1/0671; F01B 3/0073; F04B 1/148; F04B 1/2085
See application file for complete search history.

(56) References Cited

FOREIGN PATENT DOCUMENTS

| | | | | |
|---|---|---|---|---|
| CN | 107435618 A | * | 12/2017 | .............. F04B 1/295 |
| DE | 2521312 | | 7/1976 | |
| DE | 3442391 | | 1/1986 | |
| DE | 8705446 | | 5/1987 | |
| DE | 19960941 | | 6/2001 | |
| DE | 102005034739 | | 2/2007 | |
| DE | 102006023711 | | 11/2007 | |
| DE | 202007000609 | | 5/2008 | |
| DE | 102007062008 A1 | * | 6/2009 | ............ F01B 3/0073 |
| DE | 102009027204 | | 12/2010 | |
| DE | 102010054044 A1 | | 6/2012 | |
| DE | 102012202742 | | 5/2013 | |
| DE | 102013210070 | | 5/2014 | |
| DE | 102014206803 | | 7/2015 | |
| DE | 102009013094 | | 9/2018 | |
| DE | 102017126525 | | 10/2018 | |
| EP | 1001179 A2 | | 5/2000 | |
| EP | 1336722 A2 | | 8/2003 | |
| EP | 3026196 A1 | | 6/2016 | |
| GB | 1580182 A | * | 11/1980 | .......... F16C 11/0614 |
| JP | 2001304098 A | * | 10/2001 | ............ F16C 19/502 |
| WO | 2004020847 | | 3/2004 | |
| WO | 2007115516 | | 10/2007 | |
| WO | 2011032616 | | 3/2011 | |

* cited by examiner

PIVOT CRADLE BEARING AND METHOD FOR PRODUCING A SYNCHRONIZATION DEVICE OF A PIVOT CRADLE BEARING

CROSS-REFERENCE TO RELATED APPLICATIONS

This application is the U.S. National Phase of PCT Appln. No. PCT/DE2020/100668, filed Jul. 27, 2020, which claims priority from German Patent Application No. 10 2019 122 435.7, filed Aug. 21, 2019, the entire disclosures of which are incorporated by reference herein.

TECHNICAL FIELD

The disclosure relates to pivot cradle bearing suitable for use in an axial piston machine. The disclosure also relates to a method for producing a synchronization device of a pivot cradle bearing, wherein the synchronization device synchronizes movements of cage of a pivot cradle bearing guiding rolling bodies, in particular rollers, with the pivot movements of a pivot cradle.

BACKGROUND

A pivot cradle bearing of the type in question for a hydraulic axial piston machine is known, for example, from DE 25 21 312 B1. With the aid of the known pivot cradle bearing, a swash plate, i.e., a pivot cradle, can be mounted in a housing in a variable angular position. By adjusting the angular position of the swash plate, the stroke of pistons of the axial piston machine changes. The known swash plate pivot bearing comprises rollers as rolling bodies which are guided in a cage. A rod extending approximately radially to the curvature of the arcuate cage is pivotably articulated on the cage, the rod in the case of DE 25 21 312 B1 additionally being radially displaceable with respect to the cage. The rod is pivotably mounted with its one end in a stationary manner at one point on the housing and is arranged with its other end so as to be pivotable on the swash plate and displaceable in its longitudinal direction. Each pivoting of the swash plate is thus associated with a displacement of the cage, which overall provides a synchronization device.

A further axial piston machine with a pivot bearing is described in DE 10 2006 023 711 A1. In this case, a cage segment is guided by an angular guide element which is rotatably and displaceably mounted on the cage segment and has two guide legs which are attached in different ways to the parts which can be pivoted relative to one another.

DE 34 42 391 C1 discloses another tracking device for a cage of a segment rolling bearing of a cradle, i.e., a pivot cradle bearing. The tracking device comprises two guide grooves, one guide member being guided in a point of intersection of the guide grooves.

Swash plate pivot bearings with shifting links for synchronizing the cage movement with the pivot movement of a bearing part are also described in documents DE 10 2009 013 094 B4 and DE 10 2012 202 742 B3.

Various design options for cages of pivot cradle bearings can be found in documents DE 87 05 446 U1, DE 10 2005 034 739 A1 and DE 10 2014 206 803 B3. DE 10 2017 126 525 A1 describes a pivot cradle bearing in which the movement of a cage is delimited by stops.

Complete axial piston machines including a pivot cradle bearing are described, for example, in documents DE 199 60 941 A1 and DE 10 2013 210 070 B3.

SUMMARY

The object of the disclosure is to further develop a pivot cradle bearing having a synchronization device which synchronizes the relative movement of the two mounted parts which can be pivoted with respect to one another with the movement of a cage segment with respect to the prior art mentioned, in particular in terms of manufacturing aspects.

According to the disclosure, this object is achieved by a pivot cradle bearing having one or more of the features disclosed herein. The object is also achieved by a method for producing a synchronization device having one or more of the features disclosed herein. The embodiments and advantages thereof explained below in connection with the production method also apply, mutatis mutandis, to the device, i.e., the pivot cradle bearing, and vice versa.

The pivot cradle bearing comprises, in a basic concept known per se, a bent cage segment in which rolling bodies, in particular cylindrical rollers, are guided, which roll between two bearing parts which can be pivoted with respect to one another, wherein a synchronization device which is designed to synchronize the relative movement of the bearing parts with the displacement of the cage segment comprises a pivoting lever which is mounted in the cage segment.

According to the disclosure, an articulated bearing is provided for mounting the pivoting lever in the cage segment, said articulated bearing having an asymmetrical design with respect to a tangential plane laid centrally between an inner circumferential surface and an outer circumferential surface of the cage segment.

The pivoting lever protrudes from the pivot bearing on both sides. In this respect, there is a commonality between the mounting of the pivoting lever and a spherical sleeve joint known from DE 10 2009 027 204 A1. However, in contrast to the mounting of the pivoting lever, the spherical sleeve joint has a mirror-symmetrical design with respect to a central plane intersecting the ball sleeve.

It has been shown that the asymmetrical design of the articulated bearing of the pivot cradle bearing provides advantageous possibilities with respect to manufacturing for forming the bearing outer part in one piece by means of the cage segment.

The tangential plane intersects the articulated bearing centrally, i.e., at the pivot point. Unless otherwise stated, the geometrical data concerning the articulated bearing relate to the normal position of the pivoting lever. In the normal position, the pivoting lever is oriented in the radial direction of the pivot cradle bearing and thus intersects the pivot axis of the pivot cradle bearing. A straight line defined by the pivoting lever and oriented in the radial direction of the pivot cradle bearing represents a surface normal of the tangential plane.

According to various possible embodiments, an inner sliding bearing piece formed by the pivoting lever is symmetrical in contrast to the outer sliding bearing piece formed by the cage segment.

A symmetry is to be understood here as a mirror symmetry with respect to the tangential plane. The inner sliding bearing piece typically has a spherical shape. A displaceability of the pivoting lever relative to the cage segment in the radial direction, i.e., in the longitudinal direction of the pivoting lever, is not provided in a preferred embodiment.

According to a first possible design, an annular recess surrounding the articulated bearing is formed on the outer circumferential surface of the cage segment and is arranged outside an annular securing collar which is formed directly by the cage segment and, together with a spherical sliding bearing surface provided by the cage segment, holds the pivoting lever in the cage segment in a captive manner. The outer sliding bearing piece is preferably formed in one piece directly by means of the cage segment.

Shaping a bearing part of a ball joint is known in principle, for example, from documents WO 2004/020847 A1 and DE 20 2007 000 609 U1, wherein these known ball joints are designed as symmetrical joints.

Reference is also made to document WO 2007/115516 A1, in which the use of a cold forming process for producing a radial joint is described. A ball stud, which is a component of the radial joint, protrudes from a housing on one side.

According to a second possible design, the pivoting lever in the articulated bearing is secured against being pulled out by a securing ring held in the cage segment.

In this context, reference is made to WO 2011/032616 A1, which describes a joint with a ball head fastened to a pin, a ring nut being provided for bracing a bearing shell.

In both designs, the cage segment is preferably made of plastic. It is also possible to make the cage segment of metal. Both when the cage segment is made of plastic and when the cage segment is made of metal, the cage segment is preferably a one-piece component, wherein the outer piece of the articulated bearing is formed directly by means of this component. In both cases, the pivoting lever is preferably a metal part.

The synchronization device of the pivot cradle bearing can be produced in the following steps:
  providing a cage segment blank in which a through-hole with a cylindrical portion and a tapering portion adjoining the cylindrical portion is arranged,
  providing a pivoting lever which has a spherical thickened portion spaced from the ends thereof,
  inserting the pivoting lever into the through-hole of the cage segment blank, such that the spherical thickened portion comes to rest on the tapering portion of the through-hole,
  and narrowing of the cylindrical portion of the through-hole, by means of which the pivoting lever is secured against being pulled out of the through-hole.

In the first design, a partial region of the cylindrical portion of the through-hole is narrowed; for example, by heating and deforming the cage segment blank. Depending on the material, cold forming of the cage segment blank can also be considered.

Regardless of the temperature at which the deformation is carried out, the deformation of the cage segment blank is carried out; for example, by placing a punch with an annular punch surface on the outer circumferential surface of the cage segment blank.

If the articulated bearing corresponds to the second design, then, in a preferred method, the deforming of the cage segment blank is not required. Rather, in this case, the cylindrical portion is narrowed by inserting the securing ring into the cage segment blank.

In both designs of the pivot cradle bearing, the articulated bearing typically has a different mechanical load capacity in both axial directions, in relation to the longitudinal direction of the pivoting lever. The articulated bearing can thus be adapted particularly well to the actual load conditions in an axial piston machine.

BRIEF DESCRIPTION OF THE DRAWINGS

Below, two exemplary embodiments are explained in more detail by means of a drawing. In the figures.

DETAILED DESCRIPTION

Figure 1:
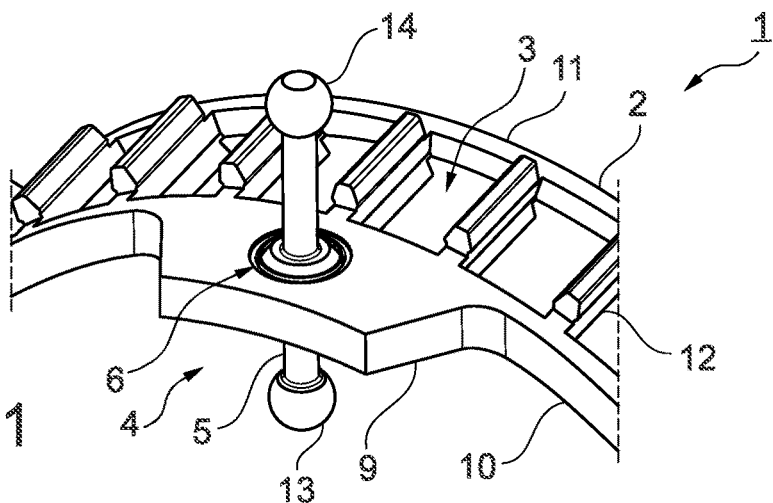
FIG. 1 shows components of a first exemplary embodiment of a pivot cradle bearing.

Unless otherwise stated, the following explanations relate to both exemplary embodiments. Parts that correspond to each other or have basically the same effect are marked with the same reference signs in all figures.

A pivot cradle bearing 1, shown only in part, comprises a curved cage segment 2 in which rolling bodies (not shown), namely cylindrical rollers, are guided in cage pockets 3. In the fully assembled state of the pivot cradle bearing 1, the rolling bodies contact a pivot cradle and a housing as bearing parts that can be pivoted relative to one another. The pivot cradle bearing 1 is part of an axial piston machine (not shown further), i.e., an axial piston pump or an axial piston motor. The volume flow through the axial piston machine can be influenced with the aid of the pivot cradle bearing 1. With regard to the basic structure and function of the pivot cradle bearing 1, reference is made to the prior art cited at the outset.

The pivot cradle bearing 1 is assigned a synchronization device, denoted as a whole by 4, which ensures that the pivoting of the cage segment 2 is coordinated with the relative movement between the bearing parts which can be adjusted with respect to one another. The synchronization device 4 comprises a pivoting lever 5 which is mounted in the cage segment 2. Here, an articulated bearing 6 is formed by the pivoting lever 5 and the cage segment 2. The articulated bearing 6 is formed by an inner sliding bearing piece 7, which is provided directly by the pivoting lever 5, and an outer sliding bearing piece 8, which is provided by a bearing plate 9 of the cage segment 2. The bearing plate 9 is slightly curved in accordance with the curvature of the cage segment 2 and merges into a cage strip 10. The cage strip 10 is connected to a further cage strip 11 via webs 12, wherein a cage pocket 3 is formed between two webs 12 that are adjacent in the circumferential direction. The webs 12 are oriented in parallel with the pivot axis of the pivot cradle bearing 1.

The inner sliding bearing piece 7 formed by the pivoting lever 5 is also referred to as a joint ball. Furthermore, the pivoting lever 5 has an end ball 13, 14 at each of its two ends. The joint ball 13 arranged radially inside the cage segment 2, i.e., the end ball 13 that is spaced from the pivot axis of the pivot cradle bearing 1 less than the cage segment 2, has a smaller distance from the joint ball 7 than the outer end ball 14. This is tantamount to the fact that an outer arm 15 of the pivoting lever 5 is longer than an inner arm 16. The length of the arms 15, 16 is measured in each case starting from the center point of the articulated bearing 6. The center point of the articulated bearing 6 lies in a tangential plane TE which is laid centrally between the inner surface and outer surface of the bearing plate 9.

The inner sliding bearing piece 7 has a spherically shaped surface and is designed to be mirror-symmetrical with respect to the tangential plane TE. The inner sliding bearing piece 7 is inserted into a through-opening 28 which is located in the bearing plate 9.

In contrast to the inner sliding bearing piece 7, the outer sliding bearing piece 8, which is provided by the cage segment 2, has an asymmetrical design with respect to the tangential plane TE. An inner portion 17 of the through-opening 28 extends radially inward from the tangential plane TE, i.e., in the direction of the pivot axis of the pivot cradle bearing 1. The radius of curvature of the inner portion 17 is conformed to the radius of the joint ball 7. The articulated bearing 6 is thus designed to support forces which load the pivoting lever 5 radially inward in its longitudinal direction. The inner portion 17 of the through-opening 28 constitutes a spherical sliding bearing surface.

In addition, the articulated bearing 6 is also able to prevent the pivoting lever 5 from being pulled outward from the cage segment 2, with comparatively small forces being absorbed in this direction. The pivoting lever 5 is secured against being pulled outward from the cage segment 2 in the two exemplary embodiments, as is explained in more detail below.

Figure 2:
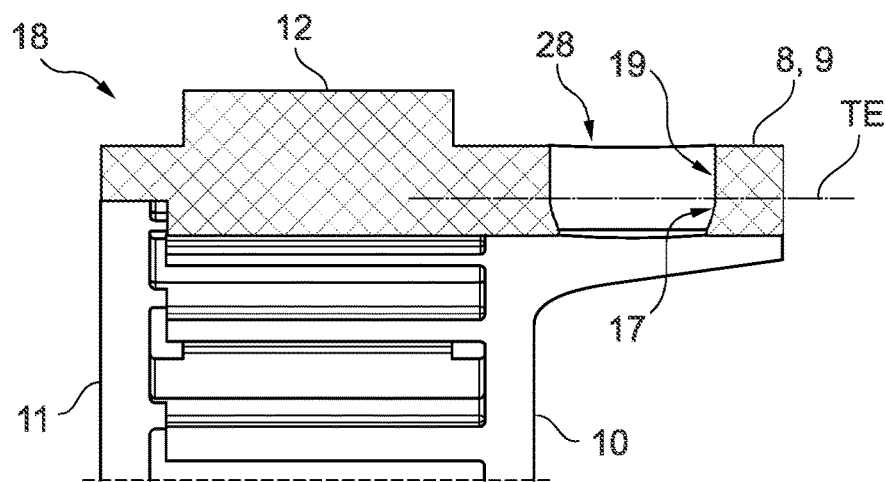
FIG. 2 shows a sectional perspective view of a cage of the pivot cradle bearing according to FIG. 1, FIGS. 3 to 6 show assembly steps for producing the arrangement according to FIG. 1.

In the manufacture of the synchronization device 4 according to FIG. 1, a cage segment blank 18 shown in FIG. 2 is assumed. The shape of the cage segment blank 18 corresponds, with the exception of the outer sliding bearing piece 8, to the shape of the final cage segment 2. The inner portion 17 of the through-opening 28 also has its final shape.

Figure 3:
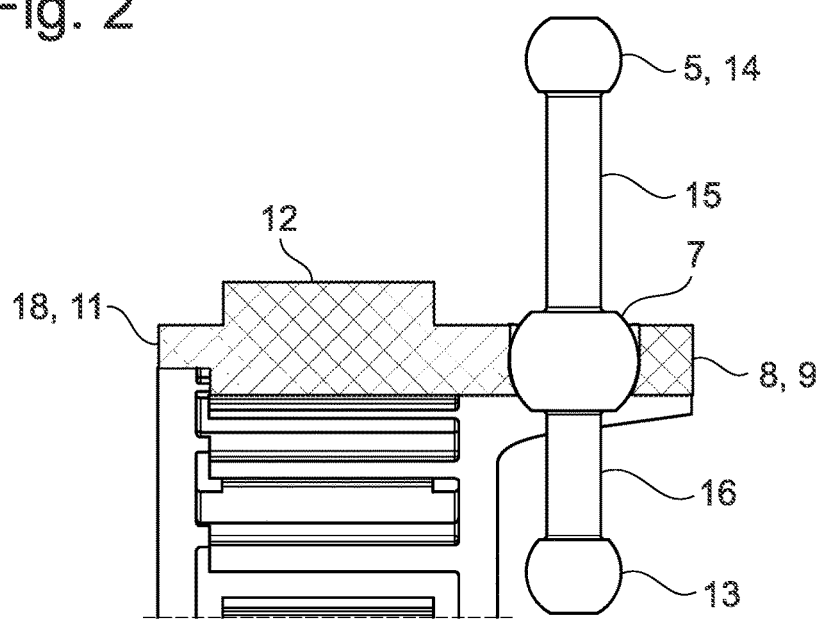

In the course of the manufacture of the synchronization device 4, the pivoting lever 5 is inserted from the outside into the outer sliding bearing piece 8 so as to give rise to the arrangement shown in FIG. 3. An outer portion 19 of the through-opening 28 which adjoins the inner portion 17 radially outwards—in relation to the pivot axis—i.e., the region of the inner surface of the outer sliding bearing piece 8 lying outside the tangential plane TE, is shaped cylindrically, with a circular cross-section, with the diameter of the outer, cylindrical portion 19 being conformed to the diameter of the joint ball 7.

Figure 4:
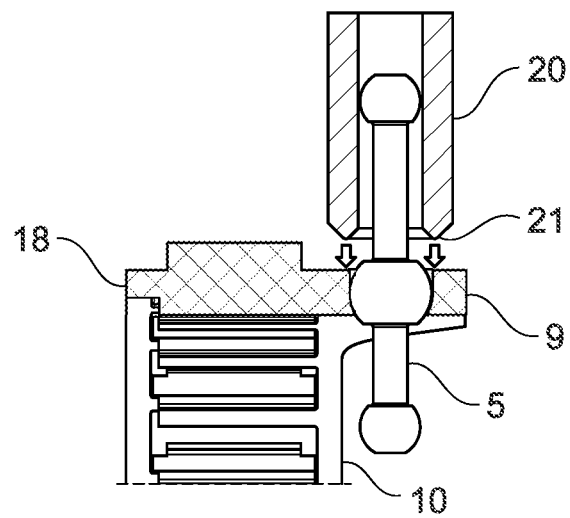
Figure 5:
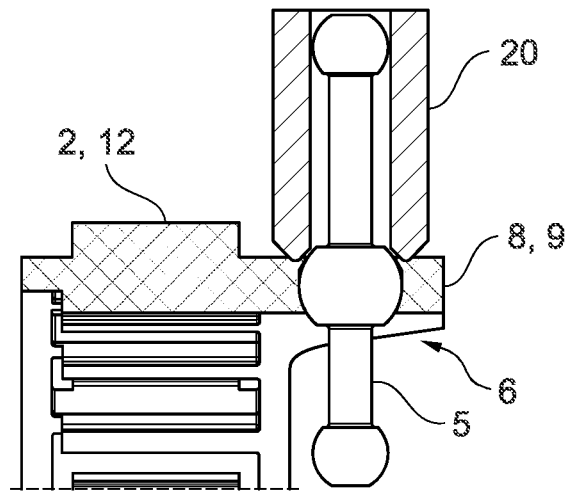
Figure 6:
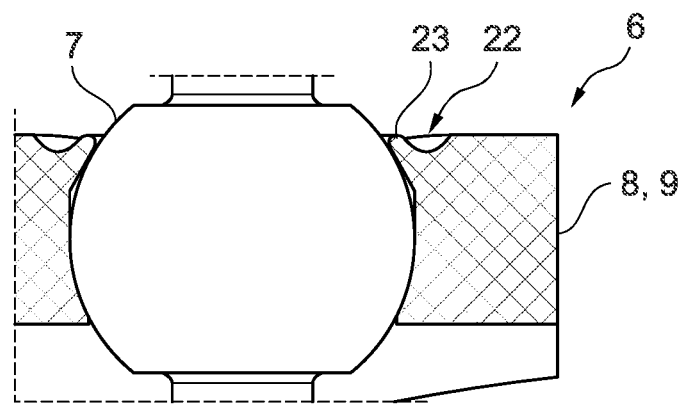

After the pivoting lever 5 has been inserted into the outer sliding bearing piece 8, the bearing plate 9 is deformed with the aid of a tool 20 which can be seen in FIGS. 4 and 5. For the purpose of deformation, the bearing plate 9 is temporarily heated. The tool 20, designed as a punch with a hollow-cylindrical shape, is placed concentrically with respect to the outer sliding bearing piece 8 and the pivoting lever 5 on the articulated bearing 6, wherein an annular machining edge 21, which forms an end face of the tool 20, is pressed into the surface of the bearing plate 9. An annular recess 22 is thus formed on the outer surface of the bearing plate 9, wherein an annular securing collar 23 is formed at the same time by material displacement, by means of which securing collar the outer portion 19 is tapered, such that the pivoting lever 5 is secured against being pulled outward from the cage segment 2 and, at the same time, a sliding bearing between the joint ball 7 and the outer sliding bearing piece 8 is provided in the corresponding direction. A non-destructive dismantling of the articulated bearing 6 is not possible in the exemplary embodiment according to FIG. 1.

Figure 7:
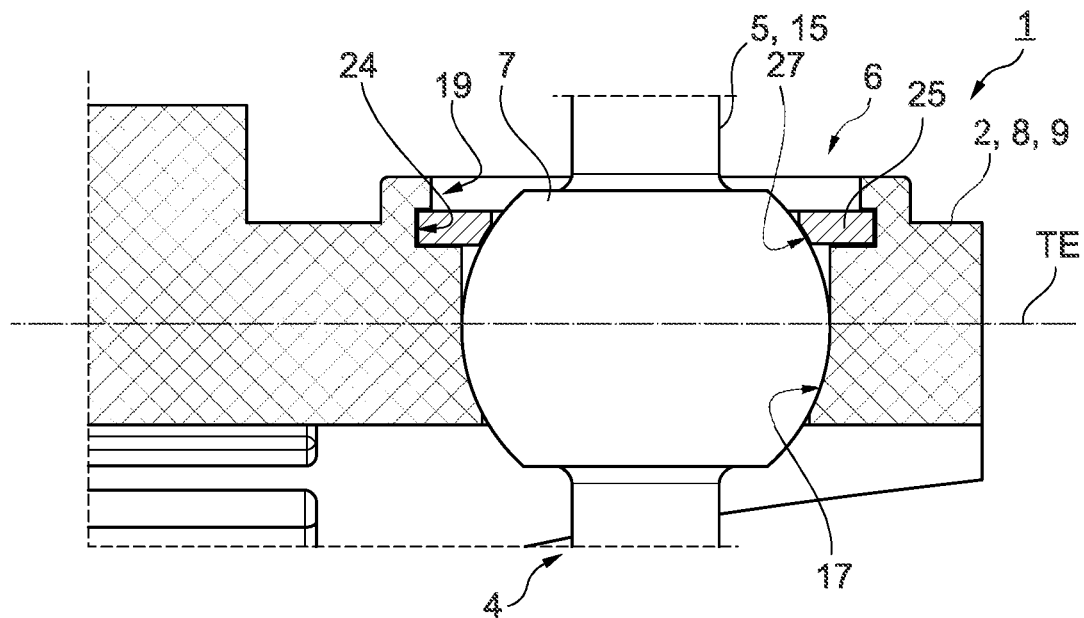
FIG. 7 shows a detail of a second exemplary embodiment of a pivot cradle bearing.
Figure 8:
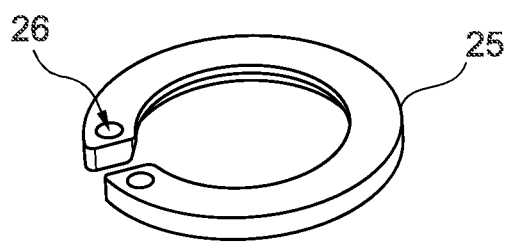
FIG. 8 shows a securing ring of the arrangement according to FIG. 7.
Figure 9:
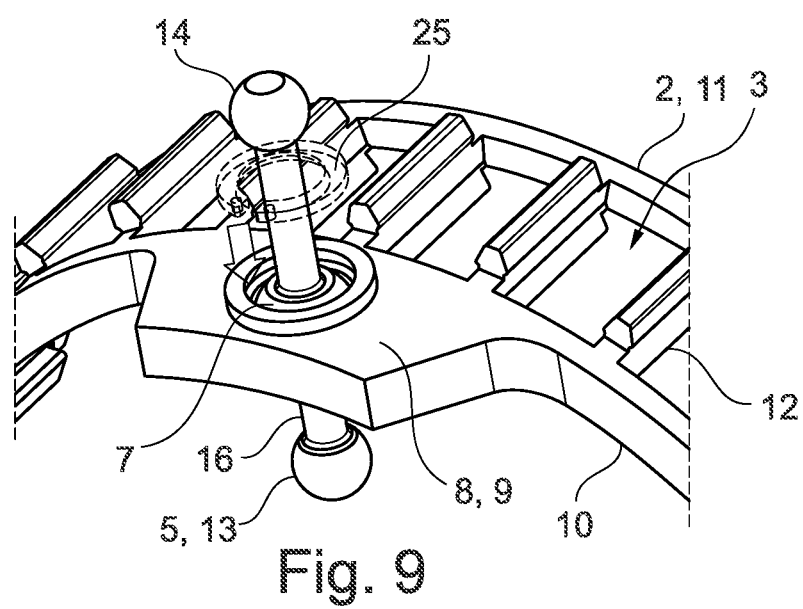
FIG. 9 shows an assembly step for producing the arrangement according to FIG. 7.

In the exemplary embodiment according to FIG. 7, the outer, cylindrical portion 19 of the outer sliding bearing piece 8 has an annular groove 24. Deformation of the cage segment blank 18 is not provided in this case. Instead, after the pivoting lever 5 has been inserted into the outer sliding bearing piece 8, a securing ring 25, shown in isolation in FIG. 8, is inserted into the annular groove 24. The non-closed securing ring 25 has openings 26 at its two ends facing one another which enable a tool to be applied for compressing the securing ring 25. With the same tool (not shown), the articulated bearing 6 can also be dismantled. Otherwise, the securing ring 25 fulfills a function corresponding to the securing collar 23. To conform to the shape of the joint ball 7, the securing ring 25 has a bevel 27 on its inner circumferential surface.

LIST OF REFERENCE SIGNS

1 Pivot cradle bearing
2 Cage segment
3 Cage pocket
4 Synchronization device
5 Pivoting lever
6 Articulated bearing
7 Inner sliding bearing piece, joint ball
8 Outer sliding bearing piece
9 Bearing plate
10 Cage strip
11 Cage strip
12 Web
13 Inner end ball
14 Outer end ball
15 Outer arm
16 Inner arm
17 Inner portion of the through-opening
18 Cage segment blank
19 Outer portion of the through-opening
20 Tool, punch
21 Machining edge
22 Annular recess
23 Securing collar
24 Annular groove
25 Securing ring
26 Opening
27 Bevel
28 Through-opening
TE Tangential plane

The invention claimed is:

1. A pivot cradle bearing, comprising:
two bearing parts which are pivotable with respect to one another;
a bent cage segment, in which rolling bodies are guided, which roll between the two bearing parts which are pivotable with respect to one another;
a synchronization device configured to synchronize a relative movement of the bearing parts with a displacement of the cage segment comprises a pivoting lever mounted in the cage segment;
an articulated bearing configured for mounting the pivoting lever in the cage segment, said articulated bearing being asymmetrical with respect to a tangential plane lying centrally between an inner circumferential surface and an outer circumferential surface of the cage segment, and said articulated bearing including a cylindrical portion and a tapering portion adjoining the cylindrical portion, the cylindrical portion conforming to at least a portion of the pivoting lever;
an inner sliding bearing piece formed by the pivoting lever that is symmetrical, and an outer sliding bearing piece formed by the cage segment which is asymmetrical; and
an annular recess surrounding the articulated bearing formed on an outer circumferential surface of the cage segment and is arranged outside an annular securing collar which is formed directly by the cage segment and, together with a spherical sliding bearing surface provided by the cage segment, captively holds the pivoting lever in the cage segment.

2. The pivot cradle bearing according to claim 1, wherein the outer sliding bearing piece is formed in one piece directly by the cage segment.

3. The pivot cradle bearing according to claim 1, wherein the cage segment is made of plastic.

4. The pivot cradle bearing according to claim 1, wherein the inner sliding bearing piece of the pivoting lever includes a diameter equal to the diameter of the cylindrical portion of the articulated bearing.

5. The pivot cradle bearing according to claim 4, wherein the inner sliding bearing piece is a joint ball.

6. A method for producing a synchronization device of a pivot cradle bearing, the method comprising:
   providing a cage segment blank in which a through-opening with a cylindrical portion and a tapering portion adjoining the cylindrical portion is arranged,
   providing a pivoting lever which has a spherical portion as an inner sliding bearing piece spaced from the ends thereof,
   inserting the pivoting lever into the through-opening of the cage segment blank, such that the spherical portion comes to rest on the tapering portion of the through-opening, and
   narrowing of the cylindrical portion of the through-opening, by heating and deforming the cage segment blank, by which the pivoting lever is secured against being pulled out of the through-opening.

7. The method according to claim 6, wherein the cage segment blank is deformed by placing a punch with an annular machining edge on an outer circumferential surface of the cage segment blank.

8. The method according to claim 6, wherein the cylindrical portion includes a diameter equal to the spherical portion of the pivoting lever.

9. A pivot cradle bearing, comprising:
   two bearing parts which are pivotable with respect to one another;
   a bent cage segment, in which rolling bodies are guided, which roll between the two bearing parts which are movable relative to one another;
   a synchronization device configured to synchronize a relative movement of the bearing parts with a displacement of the cage segment, the synchronization device comprising a pivoting lever mounted in the cage segment;
   an articulated bearing configured for mounting the pivoting lever in the cage segment, said articulated bearing being asymmetrical with respect to a tangential plane lying centrally between an inner circumferential surface and an outer circumferential surface of the cage segment; and
   a retainer that holds a portion of the pivoting lever in the cage segment, the retainer comprises a deformation formed in the cage segment.

10. The pivot cradle bearing according to claim 9, further comprising an inner sliding bearing piece formed by the pivoting lever that is symmetrical, and an outer sliding bearing piece formed by the cage segment which is asymmetrical.

11. The pivot cradle bearing according to claim 9, further comprising an annular recess surrounding the articulated bearing formed on an outer circumferential surface of the cage segment, an annular securing collar formed directly by the cage segment that forms the retainer and, together with a spherical sliding bearing surface provided by the cage segment, captively holds the pivoting lever in the cage segment.

12. The pivot cradle bearing according to claim 11, wherein the outer sliding bearing piece is formed in one piece directly by the cage segment.

13. The pivot cradle bearing according to claim 9, wherein the cage segment is made of plastic.

* * * * *